April 3, 1962  R. W. ANNESS ETAL  3,027,815
MACHINE FOR DISPENSING AND SETTING UP COLLAPSED CARTONS
Filed June 29, 1960  11 Sheets-Sheet 2

FIG. 3

INVENTORS
*Russell W. Anness*
*Frank H. Huelsbeck*

BY  Karl W. Flocks
ATTORNEY

April 3, 1962 R. W. ANNESS ETAL 3,027,815
MACHINE FOR DISPENSING AND SETTING UP COLLAPSED CARTONS
Filed June 29, 1960 11 Sheets-Sheet 3

FIG. 4

INVENTORS
*Russell W. Anness*
*Frank H. Huelsbeck*

BY Karl W. Flocks

ATTORNEY

April 3, 1962 R. W. ANNESS ETAL 3,027,815
MACHINE FOR DISPENSING AND SETTING UP COLLAPSED CARTONS
Filed June 29, 1960 11 Sheets-Sheet 9

FIG. 11

INVENTORS
*Russell W. Anness*
*Frank H. Huelsbeck*

BY Karl W. Flocks
ATTORNEY

INVENTORS
Russell W. Anness
Frank H. Huelsbeck

BY Karl W. Flocks
ATTORNEY

United States Patent Office 3,027,815
Patented Apr. 3, 1962

3,027,815
MACHINE FOR DISPENSING AND SETTING UP COLLAPSED CARTONS
Russell W. Anness and Frank H. Huelsbeck, Middletown, Ohio, assignors to Diamond National Corporation, New York, N.Y., a corporation of Delaware
Filed June 29, 1960, Ser. No. 39,651
16 Claims. (Cl. 93—53)

This invention relates generally to carton setting up machines, and more particularly to an automatically operated set-up machine for cartons generally constructed from paper board and shipped to a user in a collapsed condition. These cartons are erected and filled with articles such as bottles or cans so that they may be conveniently carried by the consumer from the store to the home.

At a bottling or canning plant, for example, the cartons for the bottles should be set up or erected with a minimum amount of time and movement of the prefolded or collapsed cartons to avoid damage or deformation to the cartons, accordingly reducing the possibility of jamming of the automatically operated mechanism of the machine, thus reducing maintenance and shut down periods.

An object of the invention is to provide a machine which will hold an unusually large supply of stacked or juxtaposed collapsed cartons to be successively set-up at a set-up station immediately below the supply of collapsed cartons, each set-up carton being ejected from beneath the supply.

A further object of the invention is to provide beneath the stack of collapsed cartons, vacuum operated means for removing a folded carton from the supply and operable to dispose the carton in an intermediate stage of erection whereby subsequent erection is accomplished by timed, mechanically operated means and the erected carton is ejected from a set-up station.

Still another object of the invention is to provide a set-up machine mechanism having a dual function including successively removing collapsed cartons from a vertically disposed stack of cartons thereabove, such means additionally functioning to dispose portions of a collapsed carton in an intermediate stage of erection at a set-up station immediately below the supply of stacked cartons.

A still further object of the invention is to provide a set-up machine which encompasses a minimum of space, and during the erection of successively dispensed collapsed cartons, involves a minimum of movement thereof to accordingly reduce or avoid the possibility of undesirable deformation to a collapsed carton and to maintain the possibility of jamming of the machine at a minimum.

Other objects and the nature and advantages of the instant invention will be apparent from the following description of a preferred embodiment of the invention taken in conjunction with the accompanying drawings, wherein.

Figures 22, 23:
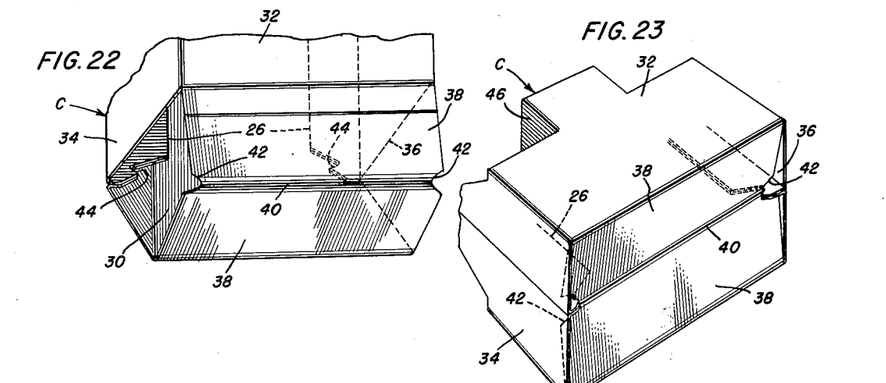
FIG. 22 is a fragmentary enlarged perspective view of a typical carton of the type erected by using the novel set-up machine showing the carton in a partially unfolded condition.
FIG. 23 is a fragmentary perspective view of an erected carton showing the manner in which the carton is locked in an erected condition.

The set-up machine of the invention, as will subsequently be described in detail, may be used for removing collapsed or folded cartons generally constructed from paper board. Although a "double lock" type of carton is shown in FIGS. 22 and 23, collapsed cartons of the type disclosed in United States Letters Patent 2,712,397 and 2,765,100 may also be set-up on the machine.

The machine is fully automatic and involves a minimum of handling of a collapsed carton after it is removed from the carton supply hopper. By minimizing the transporting and manipulation of the collapsed cartons, it is possible to keep the size of the machine at a minimum, and further eliminates the possibility of collapsed cartons becoming deformed or damaged during handling, which would accordingly give rise to damage or jamming of the handling mechanism. Further, the minimized handling of the collapsed cartons results in a reduced time interval between the time the collapsed carton is removed from its supply hopper and ultimately disposed in its finally erected condition. Still further, the use of vacuum operated gripping means is maintained at a minimum to reduce wear and maintenance of the same.

Referring to the drawings in detail, the automatic set-up machine is indicated generally at 10 and includes an enclosed base indicated generally at 12, a set-up station indicated generally at 14, and a carton supply hopper indicated generally at 16.

The front of the machine is indicated at 18, the rear at 20, and when looking into the front of the machine, the left side is indicated at 22 and the right side is indicated at 24.

Figure 1:
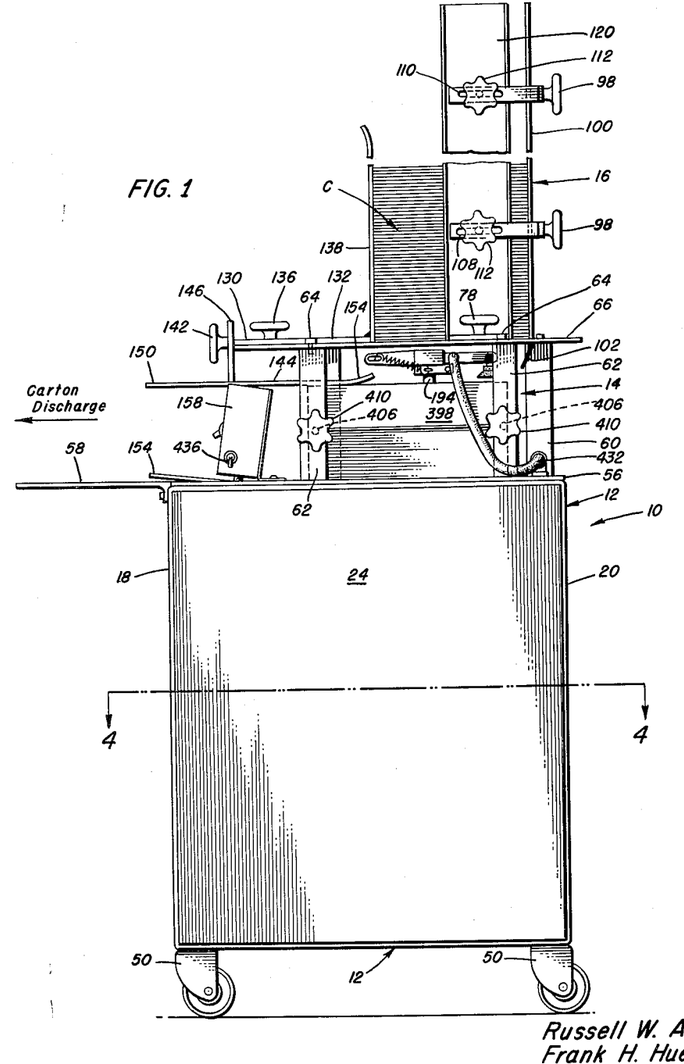
FIG. 1 is a side elevation of the novel carton set-up machine with an intermediate portion of the carton supply hopper broken away.
Figure 2:
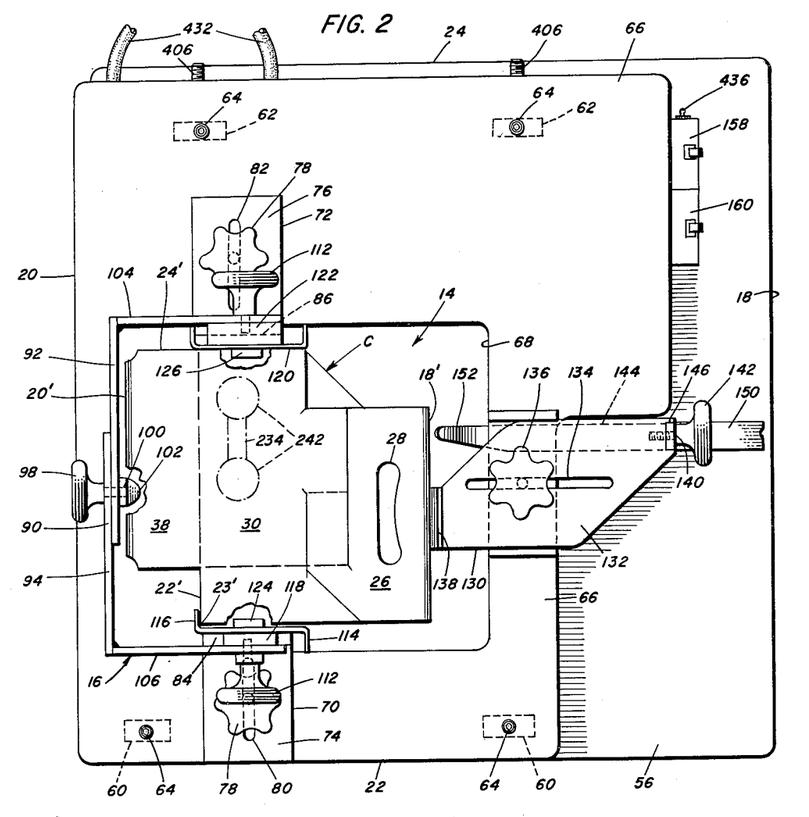
FIG. 2 is an enlarged top plan view of the novel carton set-up machine rotated 180° with respect to FIG. 1, with portions of the collapsed cartons disposed in the carton supply hopper being broken away for the purpose of showing structural details.

The carton supply hopper 16 will contain an exceptionally large operating supply of collapsed cartons (e.g. about 250), indicated generally at C, see FIGS, 2, 22 and 23.

In order to relate the collapsed containers with respect to the front, rear, and sides of the machine, as seen in FIG. 2, the front edge of the collapsed container is indicated at 18′, the rear edge at 20′, the left edge at 22′, and the right edge at 24′. The containers C include a central partition portion 26 having a transverse handle aperture 28 extending therethrough, and includes opposed upper and lower side panels 30 and 32, respectively, foldably joined to opposed outwardly and inwardly folded pairs of end wall panels 34 and 36, respectively, which are connected to a pair of outwardly folded bottom panels 38. The bottom panels 38 include at their hinge line 40 inwardly directed, notched-out portions 42 which lockingly engage inwardly directed notches 44 formed on the central partition 26 adjacent the lower end thereof, see FIGS. 22 and 23. The side panels 30 and 32 are hingedly connected to conventional cell forming straps 46, the cell forming straps 46 being hingedly connected to portions of the central partition 26. As previously mentioned, the set-up machine may be used for the purpose of erecting collapsed cartons of the character disclosed in detail in United States Letters Patent 2,712,397 and 2,765,100.

The machine base 12 is substantially rectangular when viewed in plan, and includes a lower rectangular frame 48 which may have conveniently secured to the corners suitable caster wheel assemblies 50. Extending vertically from the frame 48, at the corners thereof, are posts 52 which have fixed to the upper ends thereof an upper frame 54. The base 12 is enclosed by means of suitable panels which prevent immediate access to the operating mechanism to subsequently be described in detail; however, certain panels, not shown, may be removable where necessary for the purpose of maintenance. The panels have been removed in most of the views to facilitate the disclosure of the operating mechanism.

Suitably secured in overlying relationship to the top frame 54 is a base plate or panel 56 having a forwardly projecting extension 58 upon which erected cartons will be received. It will be noted that the erected cartons are received on the extension 58 handle-forward, this particular orientation facilitating removal of the erected cartons by an operator. Extending vertically from the base plate 56 are two pairs of support elements 60 and 62. Overlying the support elements 60 and 62, and retained thereon by means of fastening elements 64, is a plate 66 parallel to the base plate 56 and conveniently described as the hopper plate. The plate 66 includes a transverse rectangular aperture portion 68, see FIG. 2, generally defining therebeneath the area of the set-up station of the machine.

The carton supply hopper 16 includes on the plate 66, inwardly of the sides 22 and 24 of the machine, L-shaped support brackets 70 and 72 which include lower outwardly extending legs 74 and 76, respectively, which are secured on the plate 66 by means of a hand manipulable retaining screw 78. The screw 78 extends through elongated slots 80 and 82 in the legs 74 and 76, respectively, and accordingly permits the support brackets to be adjusted inwardly or outwardly relative to the set-up station 14. The brackets 70 and 72 include upwardly extending legs 84 and 86, respectively, which have supported thereon a pair of vertically spaced, forwardly opening U-shaped back-forming members 88 and 90 of the carton supply hopper 16. The back-forming members 88 and 90 each includes pairs of L-shaped elements having rear overlapping legs 92 and 94, see FIGS. 2 and 6 for example, which have overlying elongated slot portions 96 through which a hand manipulable retaining screw 98 extends. Extending vertically and adjacent the inner surface of the leg 92 of the members 88 and 90 is an elongated strap 100 which is suitably tapped to receive the end of the screw 98 and accordingly maintain the legs 92 and 94 in fixed relationship. Thus, the back-forming members 88 and 90, together with the strap 100, provide means for orienting the rear edge 20′ of the stacked cartons C, see FIG. 2, and also permit the width of the carton supply hopper 16 to be adjusted to receive these cartons. Also as seen in FIG. 2, the strap 100 has secured to the lower end thereof an inwardly extending resilient carton guide spring 102.

The legs 92 and 94 of the back-forming members 88 and 90 include forwardly extending legs 104 and 106, respectively, the legs of the lower member 88 extending transversely on the end on the outer surface of the legs 86 and 84, respectively, of the brackets 72 and 70, and having elongated slots 108 and 110 therethrough through which is received a hand manipulable retaining screw 112. The leg 84 of the support bracket 70 has secured on the inner surface thereof by means of the screw 112, see FIG. 2, a Z-shaped vertically extending side plate 114 which forms the left side of the carton supply hopper 16 and which includes an inwardly extending flange portion 116 which engages the corner 23′ of the cartons at the edge 22′ thereof. The leg 106 of the upper back-forming member 90 has a spacer element 118 interposed between the rear surface of the plate 114 and the leg 106 thereof, inasmuch as the leg 84 of the support bracket 70 does not extend up to the back-forming member 90.

Figure 3:
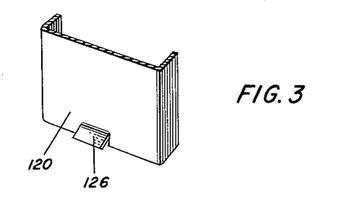
FIG. 3 is a fragmentary perspective view showing the lower end portion of one of the carton supply hopper forming elements.

The leg 86 of the support bracket 72 extends into a vertically extending U-shaped side plate 120 of the carton supply hopper which is secured to the leg 86 by means of the screw 112, as seen in FIG. 2. Suitable spacers 122 may be provided to accommodate the securement of legs 104 of the back-forming member 88 to the side plate 122. which is the right hand side of the carton supply hopper. The legs 104 and 106 of the member 90 are secured to the side plates 114 and 120 in a similar manner. Also as seen in FIGS. 2 and 3, the side plates 114 and 120 include at their lower ends inwardly extending lip elements 124 and 126, respectively, which provide the means for removably retaining the stack of cartons in the carton supply hopper 16.

The forward end of the carton supply hopper 16 comprises a support member 130 including a base portion 132 juxtaposed on the plate 66 and including an elongated slot 134 through which a hand manipulable retaining screw 136 extends. The base 132 is integral with a vertically extending guide strap or bar 138 forming the forward end of the carton supply hopper and accordingly orienting the edge 18' of the carton, as clearly seen in FIG. 2. Through the expedient of the screw 136 and the slot 134 the length of the carton supply hopper can be adjusted.

Figure 6:
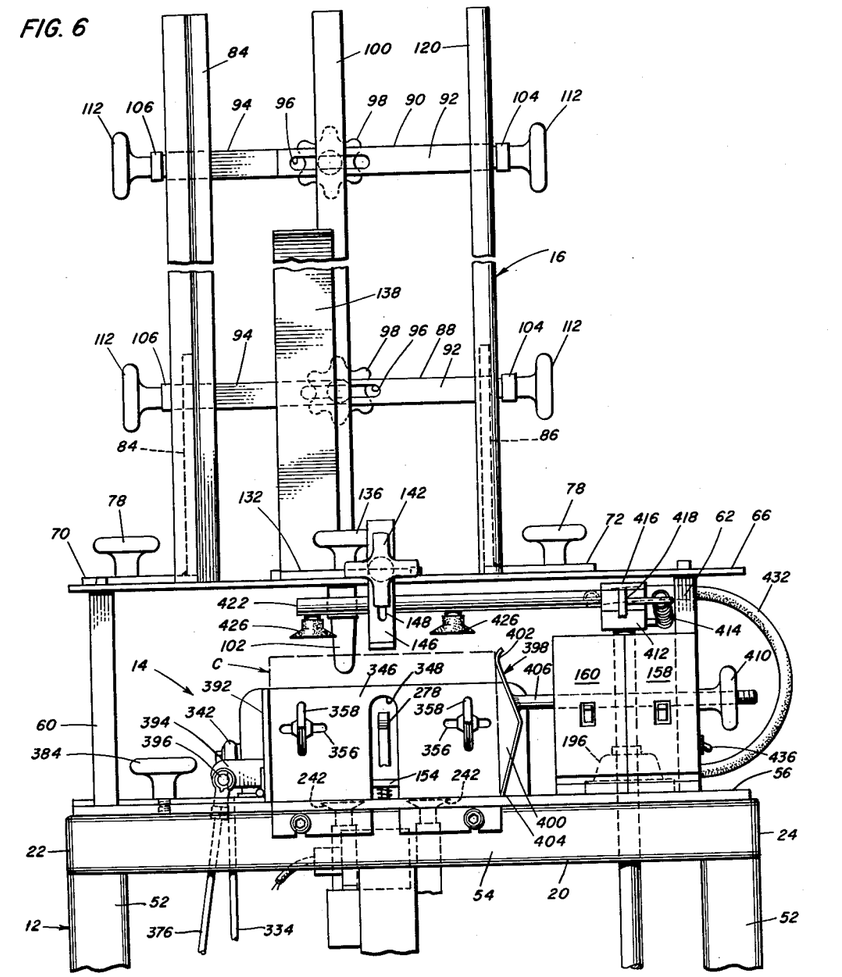
FIG. 6 is a fragmentary enlarged front elevational view of the set-up machine looking from left to right at FIG. 1.
Figures 7, 8:
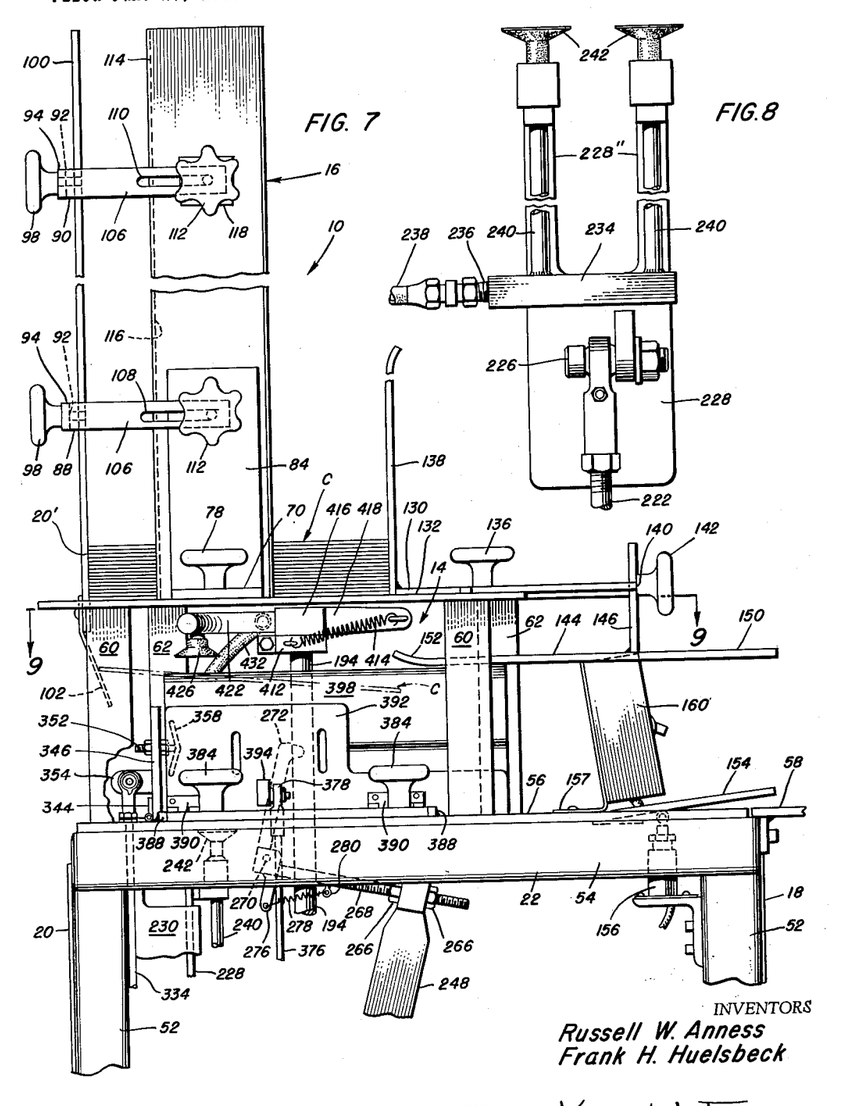
FIG. 7 is an enlarged fragmentary side elevational view at the side of the machine opposite that shown in FIGS. 1 and 5.
FIG. 8 is a further enlarged front elevational view of the lower gripping means of the set-up machine looking in the direction indicated by the plane of line 8—8 of FIG. 5.

Secured in a suitable tapped bore at the forward end 140 of the base 132 by means of a hand manipulable screw 142, see FIGS. 2, 6 and 7, is a vertically adjustable erected-carton guide strap 144 including a vertically extending support strap 146 which has an elongated slot 148 therethrough, and which is integral with a horizontally extending guide bar 150 having an upwardly turned, rearwardly extending end 152. The guide bar 150 insures that erected cartons, when ejected from the machine, as will subsequently be described in detail, will engage a vertically pivotal actuating lever 154 of a micro switch assembly 156. The micro switch is normally closed for a purpose to be described, and depression of the lever 154 will cause a circuit to be closed to a solenoid-operated vacuum control valve, also to be described in detail, relative to the functioning of the means for removing cartons from the carton supply hopper 16. As will become apparent, the micro switch assembly 156 will comprise a carton-demand means and when an erected carton is disposed thereon, i.e., an operator fails to remove it from the machine after it has been erected, the machine will no longer function to remove cartons from the carton supply hopper and automatically set them up.

Secured to the base plate 56 by means of a support bracket 157 and out of the line or path of travel of erected cartons are control switches 158 and 160, the function of which will be described in detail relative to FIG. 11.

Without describing further structure, there has been thus disclosed a carton supply hopper 16 which overlies the aperture 68 of the plate 66, this carton supply hopper being adjustable in width and length for accommodating a stack of collapsed cartons therein. Additionally, there has been disclosed means whereby erected cartons may be guided in their path of ejectment to engage the actuating lever 154 of a carton-demand control means.

Figure 4:
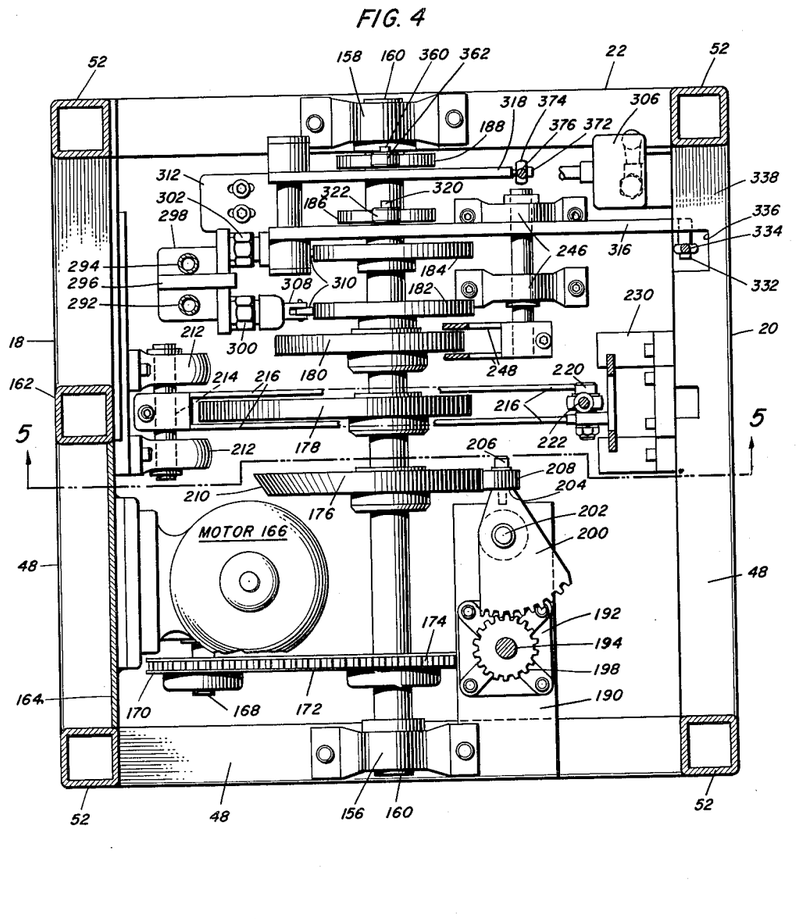
FIG. 4 is an enlarged horizontal section taken substantially on line 4—4 of FIG. 1, showing details of the various timing cams for the sequentially operated set-up mechanism of the machine.
Figure 5:
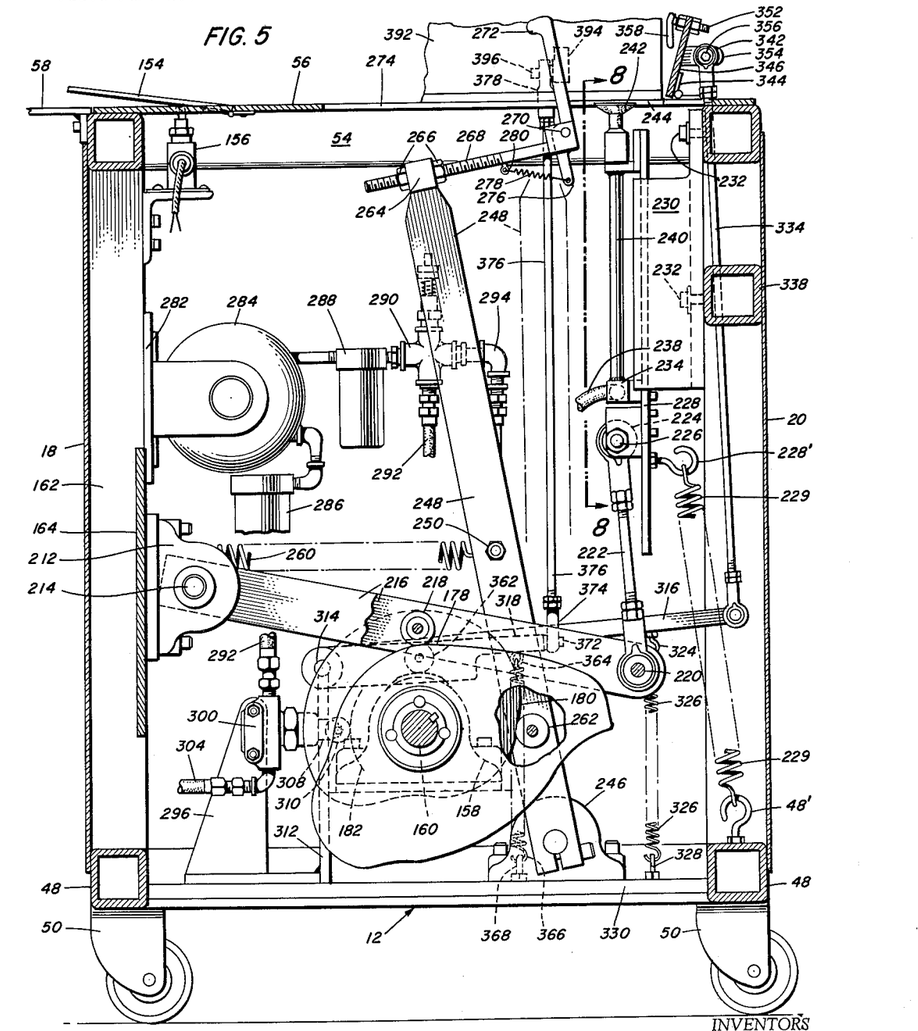
FIG. 5 is a vertical cross section taken substantially on line 5—5 of FIG. 3, with the carton supply hopper removed and showing by means of the phantom lines the position assumed by the erected carton ejectment mechanism, portions being broken away for the purposes of clarity.
Figure 10:
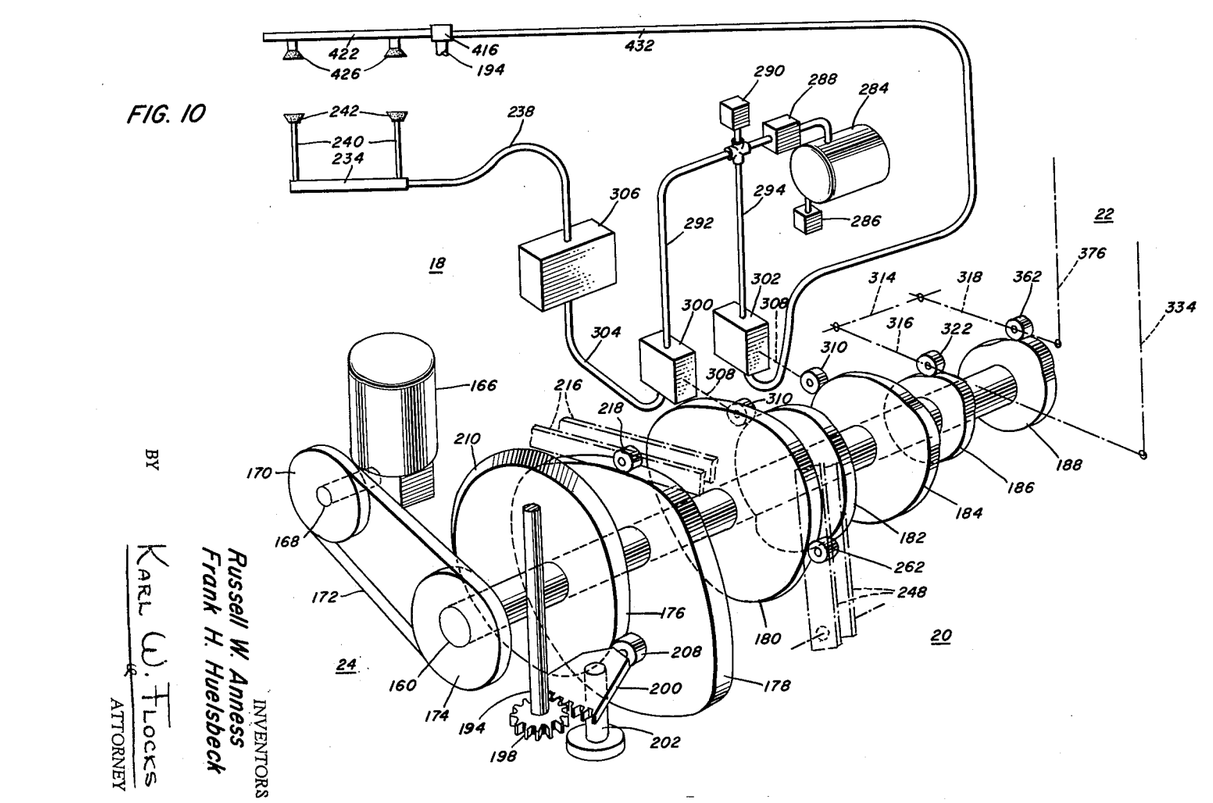
FIG. 10 is a fragmentary, diagrammatic perspective view of the power operated timing mechanism of the set-up machine.

Considering FIGS. 4, 5 and 10, the lower frame 48 has mounted on opposite sides thereof bearings 156 and 158 in which is journaled a driven shaft 160 upon which is mounted a plurality of timing cams suitably designed for affording the various collapsed carton dispensing and erection steps to be described in detail relative to FIGS. 12–21.

Extending vertically between the frames 48 and 54, adjacent the front 18 of the machine, is a post 162, see FIG. 4, and a vertical support plate 164 is secured between the post 52 at the right hand corner of the machine and the post 162. Suitably mounted on the plate 164 is a vertically disposed electrically operated motor 166 having a laterally extending power take off shaft 168 upon which is mounted a drive sprocket 170 over which is entrained a drive chain 172 meshing with a driven sprocket 174 secured on the shaft 160. The motor 166 will be energized by operating the switch 158 and will constantly rotate the shaft 160 during operation of the machine.

Considering from right to left on the shaft 160, there is suitably secured thereon in longitudinally spaced relationship a pivot-control cam 176, a vertical-reciprocation control cam 178, a lower gripping means control cam 180, a carton-ejectment control cam 182, a second gripping means control cam 184, a back plate control cam 186, and a side plate control cam 188. Specific details of the design of the various cams will not be discussed in detail; however, these cams will be so oriented and related to afford the collapsed carton dispensing function, carton erection function, and erected-carton ejectment function of the machine.

Mounted on an inwardly extending support plate 190 is a bearing 192 which has journaled therein a gripping means pivot shaft 194 which extends through the base plate or panel 56, see FIG. 6. It will be noted that an intermediate portion of the shaft 194 is received within a bearing 196, as shown by means of dotted lines in FIG. 6, and suitably mounted on the upper surface of the plate 56. Secured adjacent the lower end of the shaft 194 is a pinion gear 198 meshingly engaged with a horizontally disposed gear segment 200, which is secured to a depending shaft 202 mounted and journaled at its lower end on the plate 190. Oscillation of the gear segment 200 will cause pivotal movement of the shaft 194. Journaled to the inwardly extending end 204 of the gear segment 200, by means of a pin 206, is a cam follower 208 which rides on the outer periphery of the cam 176. It will be noted that the cam 176 is peripherally beveled at 210 to accommodate for the angular relationship of the inwardly extending end 204 of the gear segment as it follows the outer periphery of the cam 176.

Fixed to the plate 164 is a rearwardly extending bearing 212 in which is journaled a horizontally disposed support shaft 214 and on which is mounted a vertically pivotal, bifurcated cam follower arm 216 which includes an intermediate suitably journaled cam follower 218 engageable on the outer periphery of the cam 178 which controls the vertical reciprocation of the lower gripping means of the machine. The arm 216 includes a transverse support shaft 220 at its rearmost end upon which is journaled an elongated, longitudinally adjustable connecting rod 222, the upper end 224 of which is journaled on a transverse shaft 226 of a gripping means support plate 228. The plate 228 is reciprocably received in a vertically disposed guide block 230 secured at 232 at the rear of the machine as clearly seen in FIG. 5.

As seen in FIGS. 5 and 8, the plate 228 includes an integral chamber portion 234 having a nipple portion 236 connected to a flexible vacuum line 238. Extending vertically from the chamber portion 234 and communicating with the chamber portion 234 are a pair of transversely spaced, vertically extending tubes 240 terminating at their upper ends in flexible suction cup elements 242 which are extendable through a suitably apertured portion 244 in the base plate 56 of the machine. The plate 228 has a rearwardly extending hook 228' to which is secured a tension spring 229, the lower end of the spring being anchored to a hook 48' anchored on the lower frame 48. The spring 229 functions to urge the plate 228 downwardly and accordingly causes the cam follower 218 to engage the outer periphery of the cam 178.

Journaled in a lower bearing 246 is a bifurcated oscillatable support lever 248 which is intermediately connected at 250 to a tension spring 260 which is anchored to the plate 164, see FIG. 5. The lever 248 has journaled thereon a cam follower 262 which will follow the outer periphery of the control cam 180. Adjustable transversely of the upper transverse sleeve end 264 of the lever 248, by means of nuts 266, is a threaded support shaft 268 which has pivotally connected on a pin 270, transversely of the rear end portion thereof, a vertically extending carton ejectment finger 272 which extends through an elongated slot 274 in the base plate 56 of the machine. The lower end of the finger 272 includes a depending lever portion 276 which is connected to a tension spring 278 anchored at 280 on the lower surface of the screw 268. The spring 278 normally orients the finger 272 at right angles to the screw 268 and provides a lost motion connection for the finger when it oscillates rearwardly after the erected carton has been ejected from the machine.

It will be noted that the tension spring 260 urges the lever 248 forwardly and accordingly causes the cam follower 262 to constantly engage the outer periphery of the control cam 180.

Mounted above the bearing 212, as shown in FIG. 5, adjacent the forward end of the machine, is a support bracket 282 upon which is mounted an electrically driven vacuum pump 284 including a muffler 286 and an oiler 288 connected to a suitable relief valve 290, which in turn is suitably connected to flexible connection lines 292 and 294. Mounted on a suitable support bracket 296 are a pair of vacuum control valves 300 and 302, see FIGS. 4 and 5, which are respectively connected to the lines 292 and 294. The valve 300 is connected by means of a line 304 to a solenoid operated, vacuum control valve 306, shown diagrammatically in FIGS. 10 and 11, and operation of this valve is controlled by the carton-demand control or micro switch assembly 156. The valve 306 is connected to the line 238 which accordingly supplies a vacuum to the suction cups 242. As previously mentioned, vacuum will only be directed to the suction cups 242 when an erected carton is not engaged on the lever 154 of the micro switch 156. When a carton is engaged thereon, the valve 306 will be energized to a closed position and no suction will be available at the suction cups 242 to accordingly prevent cartons C from being removed from the carton supply hopper 16.

The suction control valves 300 and 302 each includes a spring urged control rod 308 which have journaled on the end thereof cam followers 310 which are respectively engaged on the outer periphery of the control cams 182 and 184.

Mounted on a vertically extending support bracket 312, see FIGS. 4 and 5, disposed adjacent the side 22 of the machine is a transverse support shaft 314, which has journaled thereon, spaced, vertically pivotal levers 316 and 318. The lever 316 includes on a laterally extending support pin 320, a cam follower element 322 engageable on the periphery of the control cam 186, and has anchored at a hook 324 depending from an intermediate portion thereof a tension spring 326 which is anchored at 328 on a base plate 330 of the machine. The spring 326 insures the engagement of the cam follower 322 on the outer periphery of the control cam 186.

Pivotally connected on a transverse pin 332, at the terminal end of the lever 316, is a vertically extending, longitudinally adjustable connecting link or rod 334, the upper end of which extends through a notched-out portion 336 in an intermediate horizontally extending support member 338. The upper frame 54 is also notched-out to accommodate the link 334 therethrough, and the base plate 56, see FIG. 9, includes an elongated aperture portion 340 to accommodate the link therethrough, the upper end of the link terminating in a bearing or eye portion 342.

Pivotally mounted on transversely spaced support hinges 344 which define an axis of rotation parallel to the rear edge of the base plate 56 a vertically pivotal, rear abutment plate 346 which includes intermediately thereof a downwardly opening cut out or slot portion 348, see FIGS. 5, 6, 7 and 9, which will accommodate movement therethrough of the ejectment finger 272 which will also move between the suction cup elements 242. It will be noted that the aperture 244 in the base plate 56 opens rearwardly in an elongated slot 350, see FIG. 9, to also accommodate rearward movement of this ejectment finger. The abutment plate 346 includes transversely spaced, forwardly projecting abutment screws 352 which are transversely adjustable in transversely extending elongated slots 356, see FIG. 6, these screws projecting forwardly of the machine and engageable adjacent the medial fold line of the bottom panel 38 of a carton being erected in order to urge this bottom panel into locking relationship for maintaining the carton in an erected position.

The abutment plate 346 includes a rearwardly extending lever portion 354 from which extends a lateral pivot pin 356 received within the bearing 342 of the link 334. The screws 352 will have secured at the terminal end thereof a forwardly extending angular abutment element 358 substantially conforming to the shape of the bottom panel 38 of a carton being erected in order to orient it into its final erected condition.

As the cam 186 is rotated with the shaft 160, the cam follower 322, through the expedient of the connecting link 346 and lever 316, will cause the abutment plate 346 to have a vertically pivotal oscillatory movement in time sequence to the other previously described control cams.

The lever 318 has intermediately mounted thereof a laterally extending pin 360 upon which is journaled the cam follower element 362 engageable on the outer periphery of the control cam 188. Anchored to an intermediately located, depending hook 364 is a tension spring 366, the lower portion of which is engaged in a hook 368 on the bottom plate 330 of the machine. The spring 366 insures that the cam follower 362 will engage on the outer periphery of the control cam. The lever 318 includes a longitudinally extending shaft portion 372 upon which is journaled for pivotal movement, the lower end 374 of a vertically extending and longitudinally adjustable connecting link 376. The connecting link 376 terminates at an upper end in a bearing portion 378 which projects through a transverse opening 380 in the base plate 56 of the machine. A support plate 382 is retained in the upper surface of the base plate 56 by means of hand manipulable retaining screws 384, see FIG. 9, and includes elongated slot portions 386 therethrough, to facilitate inward and outward adjustment of this support plate. The support plate 382 includes a notched-out portion overlying the notched-out portion 380 of the base plate. Suitable guide straps 388 are disposed at opposite side edges of the support plate 382 to guide and orient it during its adjustment. Fixed to the inner edge of the support plate 382 are a pair of support hinges 390 which define a pivotal axis normal to that of the rear abutment plate 346 for a vertically extending side abutment plate 392. Projecting rearwardly from the side abutment plate 392 is a lever portion 394 including a laterally extending pivot pin 396 received within the bearing 378 of the upper end of the connecting link 376.

Rotation of the control cam 188 results in vertical movement of the link 376 due to its connection to the lever 318 and accordingly causes oscillatory or pivotal movement of the side abutment plate 392 for the purpose of engaging the hinged end panel 34 and disposing and holding a carton in a partially erected condition.

Figure 9:
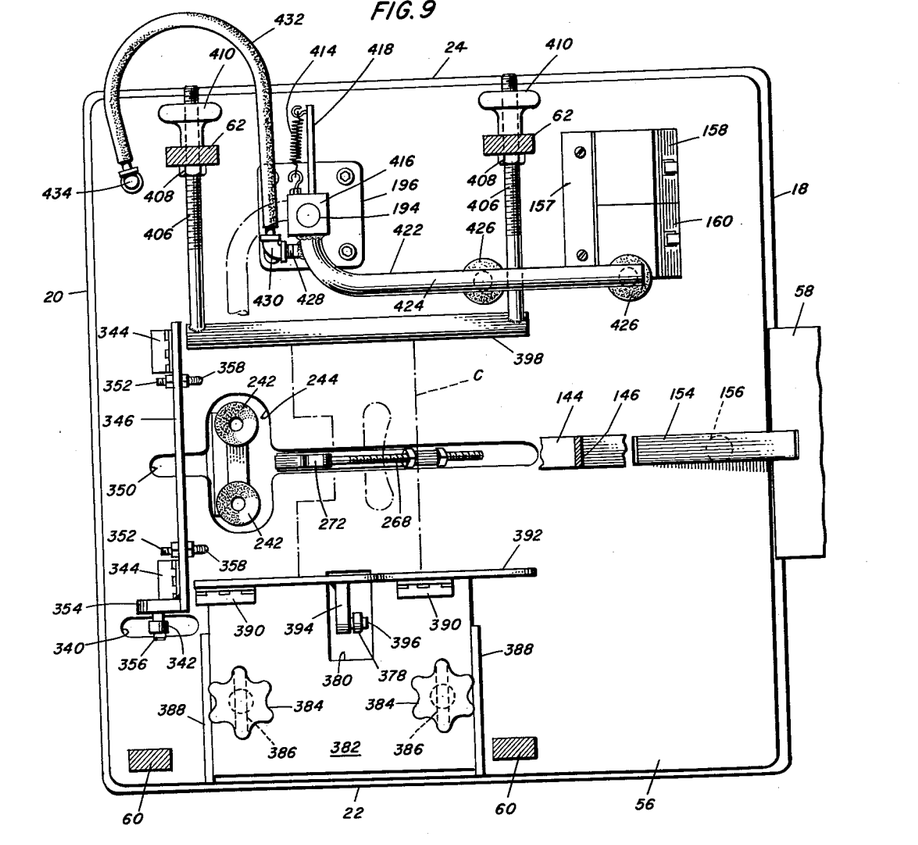
FIG. 9 is a horizontal section taken substantially on line 9—9 of FIG. 7, showing the normal position of the upper gripping means of the set-up machine.

Opposed to the pivotal side abutment plate 392 is a vertically extending, outwardly-angled, fixed abutment plate 398, see FIGS. 6 and 9, which will accommodate in the space 400 partial outward displacement of the foldable side panels 36 when the bottom panel 38 is moved into locking engagement, as previously described in detail. Further, the upper and lower edges 402 and 404 of the abutment plate 398 insure that the carton being erected will be retained in a substantially fixed position when the side abutment plate 392 is moved into engagement with the foldable side panels 34 subsequent to the bottom panel being moved into its holding position of erected carton by the abutment plate 346.

The fixed abutment plate 398 is adjustable inwardly and outwardly by means of outwardly extending threaded support bars or rods 406 which extend through transverse apertures in the vertically extending support 62 which support plates 66. Secured to the rods 406 and engageable with the inner surfaces of the supports 62 are retaining nuts 408, and a hand manipulable retaining nut 410 is engaged on the rods 406 at the outer surface of the support 62, as clearly seen in FIG. 9. The adjustment of these nuts permits the fixed abutment plate to be adjusted inwardly and outwardly.

Referring to the oscillatable vertically extending shaft 194 which is operated by the control cam 176 through the segment 200, it will be noted in FIGS. 1, 6, 7 and 9, that this shaft extends from the bearing 196 above the upper edges of the plates 346, 392, and 398, and as will be described in detail, will properly orient gripping means above the upper surface of the side panel 30 of the collapsed cartons, to retain the same in a relatively fixed position at the set-up station 14 below the carton supply hopper 16 after the suction cup elements 242 have been moved downwardly to thus partially erect the carton side panels 30 and 32 and foldable end panels 34 and 36 substantially normal to each other.

The shaft 194 has fixed thereon, above the bearing 196 and below the upper end thereof, a support collar 412 to which is anchored one end of an untensioned spring 414. Journaled on the shaft 194 above the collar 412 is a support block 416 which includes an elongated strap 418 having the other end of spring 414 connected to its terminal end. The block 416 has extending inwardly therefrom a substantially J-shaped vacuum manifold tube 422, the elongated leg 424 of which normally extends forwardly, as clearly seen in FIG. 9, and includes longitudinally spaced depending resilient suction cup elements 426. Connected to a nipple 428 by an elbow 430 is a flexible vacuum line 432 which communicates with the interior of the manifold tube 422 and is connected at 434 to the cam operated vacuum control valve 302, as shown diagrammatically in FIG. 10.

The untensioned spring 414 connected to the block 416 and terminal end of strap 418 provides a lost motion connection when the manifold tube 422 is returned from the position overlying the suction elements 242 to that shown in FIG. 9. The collar 412, see FIG. 7, is vertically adjustable.

It will be noted in FIG. 6 that the manifold tube 422 is disposed in the position of operation, i.e., swung in overlying relationship to the suction elements 242 and beneath the hopper 16.

Figure 11:
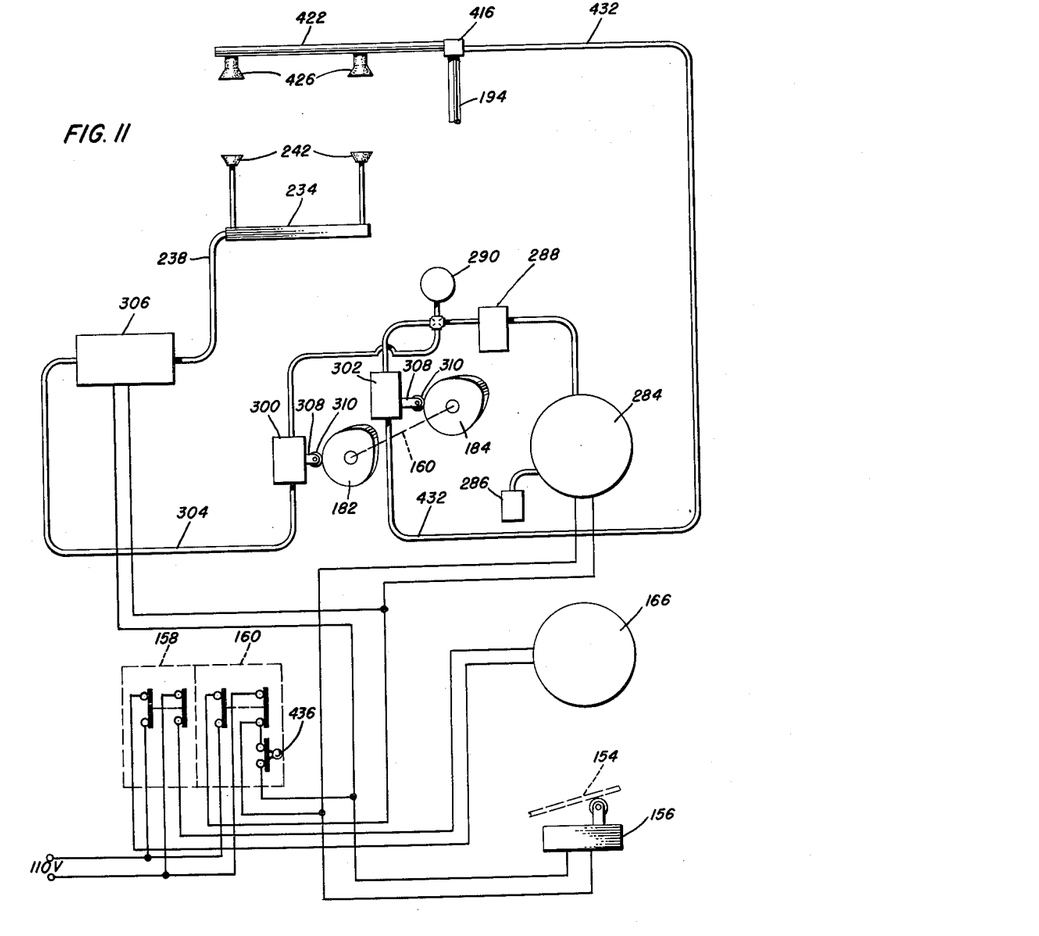
FIG. 11 is a diagrammatic view of the electrical control circuitry of the set-up machine in relation to the vacuum system thereof.

Considering FIG. 11, a source of 110 volt current is connected to the double-pole, double-throw switches 158 and 160, switch 158 when closed operating the motor 166. When the switch 160 is closed, the vacuum pump is operated and current is directed to the micro switch 156 through the hand manipulated switch 436. The micro switch 156, when the actuating lever 154 is raised, provides an open circuit to the solenoid operated vacuum control valve 306, accordingly providing vacuum at the suction cup elements 242. The vacuum pump constantly supplies vacuum at the suction cup elements 242 and 426, and the solenoid operated vacuum control valve 306 is normally open to permit this function to occur. The micro switch 156 is normally open and a circuit will be closed therein when the operating lever 154 thereof is engaged by an erected carton energizing the solenoid operated vacuum control valve 306 to prevent vacuum from being present at the suction cup elements 242. When this occurs, the control cams are continuously rotating with the shaft 160, and the lower suction elements 242 are reciprocating in the manner previously mentioned. Since no vacuum is available at the suction elements 242, a collapsed carton will not be withdrawn from the carton supply hopper 16 until the operating lever 154 of the micro switch is permitted to rise due to the removal of the erected carton off the lever.

Specific details of the wiring of the switches, motor, vacuum pump and micro switch will not be discussed in detail, and it will be observed that the specific plumbing for the vacuum system has not been shown in detail in FIGS. 4-7 in order to facilitate the showing of the operating mechanisms of the machine.

*Operation*

Figure 12:
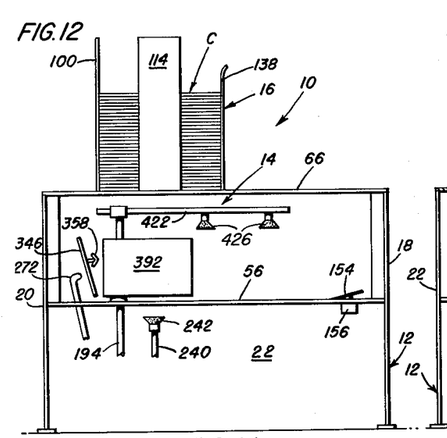
FIG. 12 is a diagrammatic side elevational view of the novel set-up machine showing the initial relative position of the parts prior to a collapsed carton being removed from the carton supply hopper.
Figure 13:
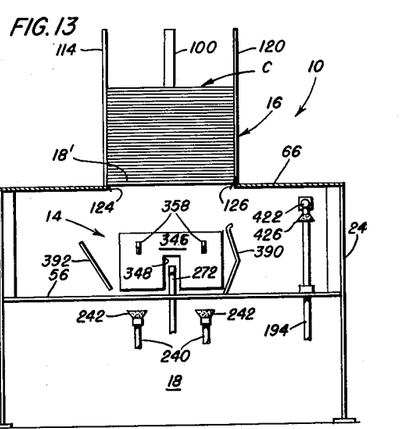
FIG. 13 is a diagrammatic front elevational view with the parts of the machine shown in the same position as FIG. 12.

Referring to FIGS. 12-21, in view of the previously described functions of the control cams 176-188, vacuum control valves 300, 302 and 306, and gripping means or suction elements 242 and 426, the carton hopper 16 will be adjusted to accommodate a vertically stacked, unusually large number of collapsed cartons which will be releasably retained therein by means of the inwardly extending lips or fingers 124 and 126 on the side plates 114 and 120, respectively. Referring to FIGS. 12 and 13, showing the machine prior to operation where a collapsed carton C will be removed from the hopper, the suction elements 242 are lowered, the side abutment plate 392 is pivoted away from one side of the set-up station 14 generally, and the rear abutment plate 346 is pivoted rearwardly, as seen in FIG. 12. Further, the upper suction elements 426, will be laterally disposed relative to the set-up station 14.

Figure 14:
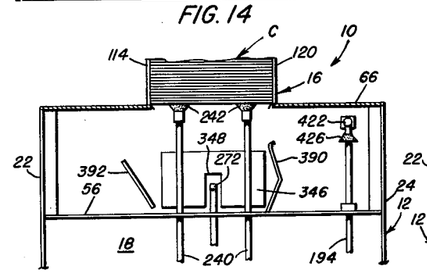
FIG. 14 is a fragmentary diagrammatic view of a portion of FIG. 13, illustrating the manner in which the lower gripping means of the machine moves vertically to remove a collapsed carton from the carton supply hopper.

Energization of the control switches 158 and 160, and switch 436 causes the vacuum pump 284 to operate supplying the vacuum to the suction elements 242 and 426. Additionally, the motor 166 will drive the shaft 160 and the control cams disposed thereon. The first step results in the lower suction elements 242 being elevated, as seen in FIG. 14, beneath the lower side panel 32 of the lowermost carton C, whereupon the lowermost collapsed carton will be grippingly engaged by the suction elements 242.

Figure 15:
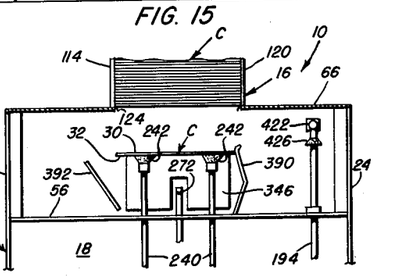
FIG. 15 is a view similar to FIG. 14, showing the next step of operation where a collapsed carton has been removed from the carton supply hopper and lowered toward the set-up station of the machine.
Figure 16:
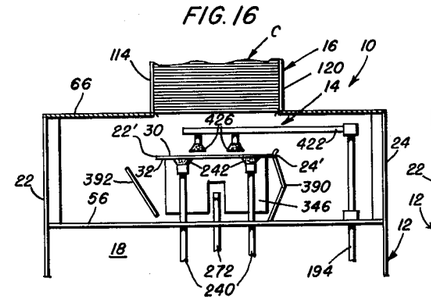
FIG. 16 is a view similar to FIG. 15, showing the manner in which the upper gripping means of the machine moves into overlying relationship relative to the lower gripping means of the machine.
Figure 17:
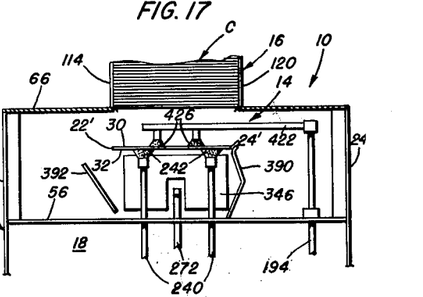
FIG. 17 is a view similar to FIGS. 14–16, showing the manner in which opposite side panels of a collapsed carton are engaged by the upper and lower gripping means of the machine.

Next, this lowermost carton will be lowered to the position shown in FIG. 15, one edge of which being in substantial engagement or adjacent to the upper end of the fixed side abutment plate 390. Next, the shaft 194 will be rotated and the suction manifold tube 422 will be positioned in overlying relationship to the upper side panel 30 of the carton which has been removed from the hopper. It will be noted in FIG. 16 that when the machine elements 426 are swung in overlying relationship, to the lower suction elements 242, they are slightly spaced above the upper side panel 30 of the carton which has been removed from the supply hopper. At this time, the lower suction elements 242 will be raised by its control cam 178 to urge the suction elements 426 to the position shown in FIG. 17. The suction elements 426 will now engage this upper side panel, see FIGS. 16 and 17.

Figure 18:
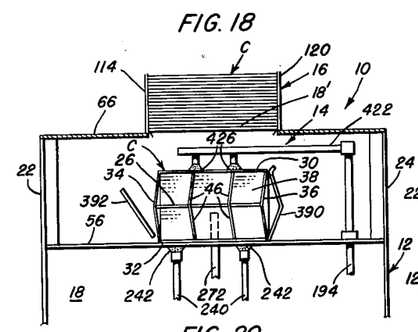
FIG. 18 is a view similar to FIGS. 14–17 showing the manner in which the lower gripping means of the machine moves downwardly through the set-up station of the machine accordingly disposing the collapsed carton in a partial intermediate stage of erection.
Figure 19:
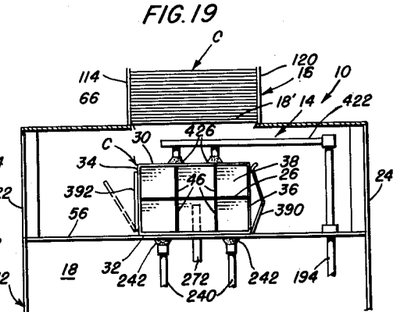
FIG. 19 is a view similar to FIGS. 14–18 illustrating the manner in which a pivotal end panel abutment plate engages an end panel to orient and retain the partially erected carton in its proper position for complete erection.
Figure 20:
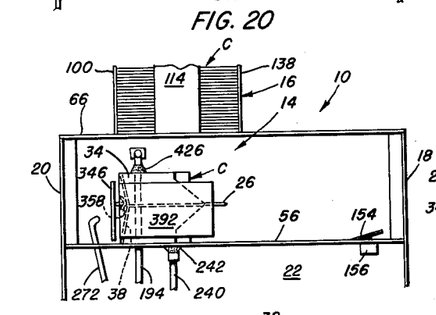
FIG. 20 is a view similar to FIG. 12 showing the manner in which a pivotal abutment plate engages the back panel of the partially erected carton whereby the carton is locked in an erected condition.

Next, referring to FIG. 18, the lower suction elements 242 will move downwardly substantially into the plane of the machine base plate 56, and thus the previously collapsed carton will be disclosed in a partially erected condition. Due to the downward movement of the lower suction elements 242 in the manner just mentioned, the folded end panels 34 and 36 will be moved in the direction opposite toward that in which they were folded. At this time, the vacuum control valves 300 and 302 which are controlled by the cams 182 and 184, respectively, will no longer direct the vacuum to the suction elements 242 and 426, respectively, and the vacuum relief valve 290 will function in a conventional manner. However, at substantially the same time, the side abutment plate 392, see FIG. 19, will be pivoted into engagement with the end panel 34 of the partially erected carton, urging the end panels 34 and 36 substantially normal to the side panels 30 and 32 and retaining the same therebetween in a sufficiently fixed position to permit the bottom panel 38 to be urged into locking engagement, as will presently be described.

Figure 21:
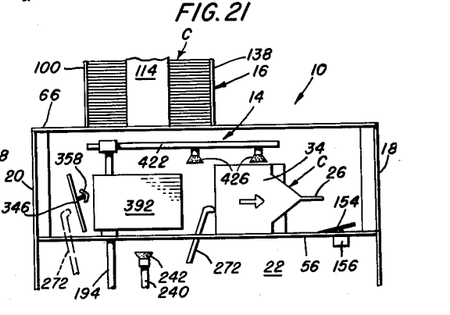
FIG. 21 is a view similar to FIGS. 12 and 20 showing the manner in which the gripping means and carton back panel abutment plate have moved to the position shown in FIG. 12 and showing the manner in which a portion of the erected carton ejectment mechanism engages the erected carton to move it out of the set-up station of the machine.

It will be noted that the ejectment finger 272 is normally located behind the rear abutment plate 346, see FIG. 12, and after the end panels 34 and 36 are disposed in the manner just mentioned, the rear abutment plate 346 will be pivoted to a substantially normal position relative to the base plate 56 of the machine, urging the outwardly folded bottom panel 38 between the end panels 34 and 36, and accordingly engaging the locking notches 42 and 44 of the carton, and in this position the previously collapsed carton is maintained in an erected condition. Referring to FIG. 21, the lower suction elements 242 will be lowered, the upper suction elements 426 will rotate laterally to one side of the set-up station 14 and out from beneath the carton supply hopper 16. Further, the rear abutment plate 346 will return to the original position shown in FIG. 12, and the ejectment finger 272 will pass through the slotted portion 348 of the rear abutment plate, see FIG. 6, and between the lower suction elements 242, the support plate 228 of which, see FIG. 8, being cut out as indicated at 228″. At the same time, the side abutment plate 392 will have pivoted back to the original position shown in FIG. 15, and the erected carton is free to move toward the lever 154 of the carton-demand switch 156 along the upper surface of the base plate 56 of the machine. The ejectment finger 272 then moves to the position shown in FIG. 12, and by phantom lines in FIG. 21, and the next sequence of operation occurs.

The next carton erected will move the previously erected carton on top of the lever 154, the guide element 150 insuring this engagement, to close the circuit controlled by the micro switch 156 and accordingly the solenoid operated control valve 306 will function to close off vacuum to the lower suction elements 242 for the purpose previously mentioned. When the erected carton is moved off of the lever 154, the machine is free to function to preform additional sequences of collapsed carton erection.

It will be observed that the showing in FIGS. 12–21 is diagrammatic. In actual operation, the cartons C which are removed from the dispenser by the lower flexible suction cup elements 242 and cooperating structure are engaged at their rear edge 20′ by the inwardly extending terminal end of the resilient carton guide spring 102, which is disposed above the level to which a removed carton is lowered. This expedient results in the removed carton being tilted forwardly, as shown in FIG. 7. When the carton is so tilted, the leg 424 and the depending resilient suction cup elements 426 thereon, may be readily pivoted into overlying relationship relative to the upper surface of a removed carton, and the carton orientation insures that no engagement between the suction cup elements 426 and the adjacent edges of the carton will occur. This expedient prevents interference between the carton and the lower suction cup elements 426 during this sequence of operation of the machine.

Thus, there has been disclosed and described in detail an automatically operating carton dispensing and set-up machine which requires a minimum amount of movement of the collapsed cartons and expeditiously erects the cartons, and continuously functions in the manner described and fully conforms with the objects of invention heretofore set forth.

It will be obvious to those skilled in the art that various changes may be made without departing from the spirit of the invention and, therefore, the invention is not to be limited to what is shown in the drawings and described in the specification, but only as defined in the appended claims. Further, various positional-directional terms have been utilized to aid in describing the exemplary embodiment; however, such terms are utilized by way of description and are not intended to be interpreted by way of limitation.

What is claimed is:

1. A machine for setting up collapsible cartons and the like, including a central portion, opposed pairs of end wall panels foldably joined at each opposite end of said central portion for respective folding medially outwardly and inwardly in relation to opposed side wall panels foldably joined between outer edges of opposed end wall pairs, and including a bottom wall panel foldably joined between lower edges of said side wall panels and foldable outwardly and medially in relation to said side wall panels, said central portion and bottom panel including cooperating locking means engageable for maintaining said collapsible carton erected when set up, said machine comprising means for holding a vertically stacked supply of collapsed cartons above a planar set-up station, first gripping means normally disposed beneath said set-up station and extendable vertically for successively gripping a carton side wall panel at said means for holding said vertical stack of cartons and removing the lowermost carton from said supply means in collapsed form vertically spaced beneath said means for holding said remaining supply of collapsed cartons, second gripping means successively positionable between said means for holding said cartons and said first gripping means, said second gripping means being grippingly engageable at the other opposite side wall panel, said first gripping means having relative vertical movement with respect to said second gripping means beneath said planar set-up station for moving said side wall panels apart towards an erected position, first pressing means spaced at opposite sides of said first gripping means at said set-up station for pressing said medially folded end panel pairs in the direction opposite to that which they are normally folded and disposing them toward an erected position, second pressing means at said set-up station rearwardly of said gripping and first pressing means for moving said bottom panel into a locked position with respect to said side and end panels, carton ejectment means rearwardly of said second pressing means and movable through said set-up station for engaging said erected carton and moving the erected carton therefrom, and means for operating said first and second gripping means, said first and second pressing means and said ejectment means in timed relationship for positioning the carton at said set-up station, erecting the carton and moving it from said set-up station in the sequence mentioned.

2. A machine as set forth in claim 1, said gripping means being vacuum operated, said first gripping means being vertically reciprocable at said set-up station, said second gripping means being movable laterally relative to the path of movement of said first gripping means.

3. A machine as set forth in claim 1, and control means spaced from said set-up station and engageable by an erected carton moved therefrom by said ejectment means for permitting a cycle of operation to occur after a carton is erected and engaged therewith.

4. A machine as set forth in claim 1, said ejectment means being movable transversely beneath said second pressing means and between said first pressing means spaced at said set-up station.

5. A machine as set forth in claim 1, said first pressing means spaced at said set-up station comprising vertically disposed abutment means adjustable laterally with respect to said set-up station, and a second vertically pivotal abutment means movable relative to said set-up station.

6. A machine as set forth in claim 1, said ejectment means comprising oscillatable finger means for engaging the erected carton.

7. A machine as set forth in claim 2, and control means spaced from said set-up station and engageable by an erected carton moved therefrom by said ejectment means for permitting a cycle of operation to occur after a carton is erected and engaged therewith.

8. A machine as set forth in claim 2, said ejectment means being movable transversely beneath said second pressing means and between said first pressing means spaced at said set-up station.

9. A machine as set forth in claim 2, said first pressing means spaced at said set-up station comprising vertically disposed abutment means adjustable laterally with respect to said set-up station, and a second vertically pivotal abutment means movable relative to said set-up station.

10. A machine as set forth in claim 2, said ejectment means comprising oscillatable finger means for engaging the erected carton.

11. A machine as set forth in claim 7, said ejectment means being movable transversely beneath said second pressing means and between said first pressing means spaced at said set-up station.

12. A machine as set forth in claim 7, said first pressing means spaced at said set-up station comprising vertically disposed abutment means adjustable laterally with respect to said set-up station, and a second vertically pivotal abutment means movable relative to said set-up station.

13. A machine as set forth in claim 7, said ejectment means comprising oscillatable finger means for engaging the erected carton.

14. A machine as set forth in claim 11, said first pressing means spaced at said set-up station comprising vertically disposed abutment means adjustable laterally with respect to said set-up station, and a second vertically pivotal abutment means movable relative to said set-up station.

15. A machine as set forth in claim 11, said ejectment means comprising oscillatable finger means for engaging the erected carton.

16. A machine as set forth in claim 15, said first pressing means spaced at said set-up station comprising vertically disposed abutment means adjustable laterally with respect to said set-up station, and a second vertically pivotal abutment means movable relative to said set-up station.

References Cited in the file of this patent

UNITED STATES PATENTS

| | | |
|---|---|---|
| 2,780,970 | Gentry | Feb. 12, 1957 |
| 2,782,695 | Neissner et al. | Feb. 26, 1957 |
| 2,831,681 | Gentry | Apr. 22, 1958 |
| 2,842,363 | Leavens | July 8, 1958 |